United States Patent [19]

Macrander

[11] 3,729,638

[45] Apr. 24, 1973

[54] SUBSCRIBER INTERFACE CIRCUIT FOR UNBALANCED SEMICONDUCTOR SWITCHING SYSTEM

[75] Inventor: Max S. Macrander, Warrenville, Ill.

[73] Assignee: GTE Automatic Electric Laboratories Incorporated, Northlake, Ill.

[22] Filed: Dec. 9, 1971

[21] Appl. No.: 206,386

[52] U.S. Cl. ...............307/254, 179/18 GF, 307/296

[51] Int. Cl. ...............H03k 17/60

[58] Field of Search ...............307/254, 296; 179/18 GF

[56] References Cited

UNITED STATES PATENTS 3,103,635 9/1963 Campbell et al. ...............330/16 X

*Primary Examiner*—John Zazworsky

*Attorney*—K. Mullerheim

[57] ABSTRACT

An interface circuit for use between a subscriber loop and an unbalanced semiconductor crosspoint switching network for providing dc separation and bilateral ac transmission without the use of a separation transformer.

4 Claims, 1 Drawing Figure

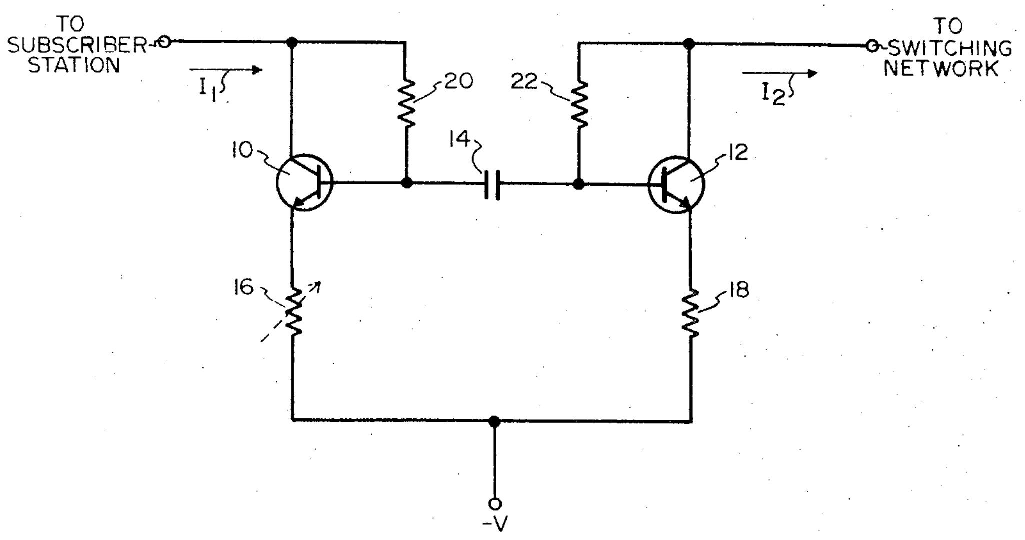
INVENTOR
MAX S. MACRANDER
BY Robert Van Epps
ATTORNEY

SUBSCRIBER INTERFACE CIRCUIT FOR UNBALANCED SEMICONDUCTOR SWITCHING SYSTEM

BACKGROUND OF THE INVENTION

1. Field of the Invention

The present invention relates generally to the field of telephony and in particular to a new and novel transformerless interface circuit for use between a subscriber loop and an unbalanced semiconductor crosspoint switching network.

2. Description of the Prior Art

In general the direct replacement of the mechanical switches of a telephone system with solid state crosspoints will only be feasible if a substantially constant DC current in excess of the crosspoint holding current is present at the switching network. This requirement in turn raises the requirement for a DC to DC interface between the crosspoint switching network and the subscriber loop since the line current is subject to outside disturbances. The line current is further not of a constant value since it is temporarily interrupted by dial pulsing or hook switch movements. In order to provide DC separation of the subscriber loop from a balanced (two wire) switching network a transformer is generally used. An improved DC compensated transformer for use in such applications is disclosed in U.S. Pat. application Ser. No. 199,464, entitled "D.C. Compensation Circuit for Miniature Transformers" of the same inventor and assigned to the same assignee as the present application. Where, however, an unbalanced (single wire) crosspoint switching network is used the self-balancing effect of the DC bias current of the two wire crosspoint network at the transformer secondary is not present. Under such circumstances it is desirable to eliminate the interface transformer in the interests of economy and space savings.

OBJECTS AND SUMMARY OF THE INVENTION

From the above discussion it will be understood that among the various objectives of the present invention are included the following:

to provide a new and novel current transformer circuit; and to provide a transformer circuit of the above-described character which permits DC currents on either side to be independent.

These and other objectives of the present invention are efficiently achieved by providing a pair of capacitively isolated transistor switches each of which passes DC current independently of the other in respective loops but passing AC signals between one another via the isolating capacitance.

The foregoing as well as other objects, features and advantages of the present invention will be more fully understood from the following detailed description taken in conjunction with appended drawing.

BRIEF DESCRIPTION OF THE DRAWING

The single appended FIGURE is a schematic illustration of a subscriber loop interface circuit constructed in accordance with the principles of the present invention.

DESCRIPTION OF PREFERRED EMBODIMENT

With reference now to the FIGURE there is illustrated a current transformer circuit providing DC separation and bilateral AC transmission. First and second transistors 10 and 12 biased in the active state have their base leads coupled together via capacitor 14. The emitter leads are coupled through resistors 16 and 18 respectively to a voltage supply, −V, which in the telephone system application of the invention would be the −48 volt central office battery voltage. The collector lead of each transistor 10 and 12 is coupled to its base via resistors 20 and 22 respectively and to the respective lines to be isolated. In the application of the invention to isolating a telephone subscriber loop from an unbalanced, i.e., single wire, crosspoint switching network the collector of one transistor is coupled to the network and that of the other is coupled to the subscriber station.

It will be seen that the DC currents $I_1$ and $I_2$ in transistors 10 and 12 will be independent, the isolation being provided by capacitor 14. The transmission of AC signals through the circuit is bi-directional and the current ratio $I_1/I_2$ is determined by the ratio of resistances of resistors 16 and 18; i.e., $R_{16}/R_{18}$. Provision for balancing this current ratio may easily be made by using variable resistance elements as indicated by the arrow shown in phantom on resistor 16.

When two circuits as illustrated in the FIGURE are coupled back-to-back, as would be the case when both calling and called subscriber loops are isolated from an intermediate crosspoint switching network, the ratio of input to output currents has been found by the applicant to be substantially 1.0. The circuit introduces a transmission loss since, with substantially equal input and output currents, the AC input voltage is greater than the AC output voltage. This is due to the fact that the AC input voltage is the voltage drop over the input impedance of the transistor 10 or 12 and the AC output voltage is across the subscriber loop resistance. The transmission losses in a complete transmission path incorporating the circuit of the present invention were observed by the applicant to be about 4 db between the calling and called subscriber loops. Although these losses are higher than those introduced by the conventional transformer coupled interface circuit, the savings in space and expense made available through elimination of the transformer make the use of the applicant's circuit highly desirable. The transmission losses are further well within the acceptable limits for normal PAX operations. It will further be understood from reference to application Ser. No. 200,671, entitled "Amplifying Junctor Circuit" by the same inventor and assigned to the same assignee as the present application, that the losses introduced by the interface circuit of the present invention may easily be compensated if desired, if the present invention is used in other than PAX systems.

From the foregoing it will be understood that the Applicant has provided a new and novel subscriber interface circuit for an unbalanced semiconductor telephone switching system wherein the objectives set forth hereinabove are efficiently met. Since certain changes in the above-described construction will occur to those skilled in the art without departure from the scope of the invention it is intended that all matter contained in the above-description or shown in the appended drawing shall be interpreted as illustrative and not in a limiting sense.

Having described what is new and novel and desired to secure by Letters Patent, what is claimed is:

1. an electrical current transformer circuit comprising first and second normally conductive switching means each comprising an npn transistor and a resistance coupled between the collector and base thereof, and a capacitance coupled between the bases of said transistors such that DC electrical currents are conducted independently by said first and second transistors, and are blocked by said capacitance from being conducted between the bases of said transistors.

2. A circuit as recited in claim 1 further including a source of negative DC potential coupled to the emitters of each of said transistors.

3. A circuit as recited in claim 2 further including a balancing resistance coupled between said source of potential and each of said emitters.

4. A circuit as recited in claim 3 wherein at least one of said balancing resistances is a variable resistance.

* * * * *